United States Patent
Shacklette et al.

(10) Patent No.: US 8,559,774 B2
(45) Date of Patent: Oct. 15, 2013

(54) OPTICAL DEVICE HAVING AN ELASTOMERIC WAVEGUIDE SWITCH BODY AND RELATED METHODS

(75) Inventors: Lawrence Wayne Shacklette, Melbourne, FL (US); Glenroy Weimar, Palm Bay, FL (US); Michael Raymond Weatherspoon, West Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 356 days.

(21) Appl. No.: 13/076,563

(22) Filed: Mar. 31, 2011

(65) Prior Publication Data
US 2012/0251043 A1 Oct. 4, 2012

(51) Int. Cl.
*G02B 6/26* (2006.01)
*G02B 6/42* (2006.01)

(52) U.S. Cl.
USPC .................. 385/16; 385/18; 385/25; 385/50

(58) Field of Classification Search
USPC ....................................... 385/16, 18
See application file for complete search history.

(56) References Cited

U.S. PATENT DOCUMENTS

| | | | |
|---|---|---|---|
| 3,963,323 A | 6/1976 | Arnold | 350/96.21 |
| 4,325,607 A | 4/1982 | Carlsen | 350/96 |
| 4,930,859 A | 6/1990 | Hoffman, III | 350/96.21 |
| 5,058,983 A | 10/1991 | Corke et al. | 385/78 |
| 5,263,103 A | 11/1993 | Kosinski | 385/31 |
| 5,515,465 A | 5/1996 | Olin et al. | 385/64 |
| 5,619,610 A | 4/1997 | King et al. | 385/139 |
| 5,778,127 A | 7/1998 | Gilliland et al. | 385/92 |
| 6,005,993 A | 12/1999 | MacDonald | 385/16 |
| 6,097,873 A | 8/2000 | Filas et al. | 385/140 |
| 6,345,132 B1 | 2/2002 | Picard et al. | |
| 6,463,192 B1 | 10/2002 | Kapany | 385/17 |
| 6,501,900 B1 | 12/2002 | Aloisio, Jr. et al. | 385/140 |
| 6,748,132 B1 | 6/2004 | Kapany et al. | 385/24 |
| 6,873,754 B2 | 3/2005 | Hatta et al. | 385/16 |
| 6,975,793 B2 | 12/2005 | Cole et al. | 385/33 |
| 7,079,725 B2 | 7/2006 | Sherrer et al. | 385/16 |
| 7,113,704 B1 | 9/2006 | Lin | 398/83 |
| 7,171,069 B1 | 1/2007 | Laughlin | 385/18 |
| 7,404,679 B2 | 7/2008 | Ebbutt et al. | 385/78 |
| 7,512,294 B2 | 3/2009 | Wang et al. | 385/13 |

(Continued)

OTHER PUBLICATIONS

Polatis Incorporated, Single Mode Optical Switches with Up to 32x32 Ports, 2009, pp. 1-2.
Beddows at al., The application of frustrated total internal reflection devices to analytical laser spectroscopy, 2002, pp. 125-127.

(Continued)

*Primary Examiner* — Hemang Sanghavi
(74) *Attorney, Agent, or Firm* — Allen, Dyer, Doppelt, Milbrath & Gilchrist, P.A.

(57) ABSTRACT

An optical device may include a substrate and an optical waveguide carried by the substrate and having a notch therein defining a feed optical waveguide and a longitudinal optical waveguide section on opposite longitudinal sides of the notch. The optical device may also include a transverse optical waveguide section carried by the substrate and transversely aligned with the feed optical waveguide adjacent the notch. The optical device may further include an elastomeric waveguide switch body configured to be moved between a first position within the notch and operative to switch light from the feed optical waveguide to the longitudinal optical waveguide section, and a second position removed from the notch and operative to switch light from the optical waveguide to the transverse optical waveguide section.

21 Claims, 9 Drawing Sheets

(56) References Cited

U.S. PATENT DOCUMENTS

| | | | |
|---|---|---|---|
| 7,519,250 B2 | 4/2009 | Maki | 385/40 |
| 7,760,972 B2 | 7/2010 | Wen et al. | 385/22 |
| 2002/0181844 A1 | 12/2002 | Vaganov | 385/17 |
| 2003/0035613 A1* | 2/2003 | Huber et al. | 385/16 |
| 2003/0194170 A1 | 10/2003 | Wong et al. | |
| 2004/0012965 A1 | 1/2004 | Yoneda et al. | |
| 2008/0075414 A1 | 3/2008 | Van Ostrand | 385/146 |
| 2008/0170822 A1* | 7/2008 | Bae et al. | 385/18 |
| 2008/0226232 A1 | 9/2008 | Bulthuis et al. | 385/37 |
| 2012/0189253 A1 | 7/2012 | Shacklette et al. | |
| 2012/0263414 A1* | 10/2012 | Tan et al. | 385/18 |

OTHER PUBLICATIONS

Laughlin at al., Frustrated Total Internal Reflection an Alternative for Optical Cross-Connect Architectures, 1998, pp. 171-172.

Files et al., Index-Matching Elastomers for Fiber Optics, Mar. 1990, pp. 133-136.

Horsley et al., Optical and Mechanical Performance of a Novel Magnetically Actuated MEMS-Based Optical Switch, Apr. 2005, pp. 274-284.

Alcon Technologies, Optical Switch, Optical Test Access Unit (OTAU), May 2006, pp. 1-3.

Polatis Incorporated, Carrier-Class Photonic Switching Products, 2010, pp. 1-2.

* cited by examiner

OPTICAL DEVICE HAVING AN ELASTOMERIC WAVEGUIDE SWITCH BODY AND RELATED METHODS

FIELD OF THE INVENTION

The present invention relates to the field of optics, and, more particularly, to an optical switch, and related methods.

BACKGROUND OF THE INVENTION

An optical fiber is commonly used in telecommunications for communicating data signals over both short and long distances. With respect to other communication mediums, such as a metal wire, an optical fiber is advantageous in that signals travel along it with less loss, and it is also less susceptible to electromagnetic interference. An optical fiber may also have a relatively high bandwidth. An optical fiber may also be used in other applications, such as a sensor and a laser, for example.

A fiber-optic matrix switch may be used for a variety of network switching applications, and more particularly, for switching applications using optical fibers. Such switches are typically assembled from a fundamental building block, such as a 1×N switch, for example, that can direct an input to any one of N outputs.

Generally, for an optical matrix switch in a particular application, loss, crosstalk, reflection, and switching speed may be considered. Power consumption may also be considered. Cost and duty cycle are other factors that may be considered when selecting an optical matrix switch.

Generally, a relatively large matrix switch (M×N) uses either beam steering or reflection optics based upon microelectromechanical system (MEMS) mirrors in a two dimensional (2D) or a three-dimensional (3D) configuration. A relatively large matrix switch typically requires a 3D geometry. Additionally, a relatively large matrix switch uses free-space propagation of light and a form of collimation optics and generally has losses from recapturing the light into a fiber waveguide. However, this type of matrix switch may be advantageous in that the light may be directed from any input port to any output port without passing through any intervening switching elements, and therefore may be inherently non-blocking. However, the matrix switch generally requires continuous power to operate.

U.S. Pat. No. 6,873,754 to Hatta et al., for example, discloses an optical switch. The optical switch includes a polymer sheet having an optical waveguide extending linearly therein, and keep plates holding the polymer sheet therebetween. The polymer sheet has a notch to traverse the optical waveguides, and the keep plates each have an opening at a position corresponding to the notch.

U.S. Pat. No. 6,005,993 to MacDonald discloses an optical matrix switch. The optical matrix switch includes glass blocks that are moved relative to another glass block to route light. The glass blocks contact each other via an elastomer index matching element.

SUMMARY OF THE INVENTION

In view of the foregoing background, it is therefore an object of the present invention to provide a relatively low loss optical switch.

This and other objects, features, and advantages in accordance with the present invention are provided by a an optical device that includes a substrate and an optical waveguide carried by the substrate and having a notch therein defining a feed optical waveguide and a longitudinal optical waveguide section on opposite longitudinal sides of the notch. The optical device also includes a transverse optical waveguide section carried by the substrate and transversely aligned with the feed optical waveguide adjacent the notch. The optical device further includes an elastomeric waveguide switch body configured to be moved between a first position within the notch and operative to switch light from the feed optical waveguide to the longitudinal optical waveguide section, and a second position removed from the notch and operative to switch light from the feed optical waveguide to the transverse optical waveguide section. Accordingly, the optical device switches light between the feed optical waveguide and either the longitudinal waveguide section or the transverse optical waveguide with a reduced signal loss.

A method aspect is directed to a method of switching light within an optical device comprising an optical waveguide carried by a substrate and having a notch therein defining a feed optical waveguide and a longitudinal optical waveguide section on opposite longitudinal sides of the notch. The optical device also includes a transverse optical waveguide section carried by the substrate and transversely aligned with the feed optical waveguide adjacent the notch. The method includes moving an elastomeric waveguide switch body between a first position within the notch and operative to switch light is switched from the feed optical waveguide to the longitudinal optical waveguide section and a second position removed from the notch and operative to switch light from the feed optical waveguide to the transverse optical waveguide section.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
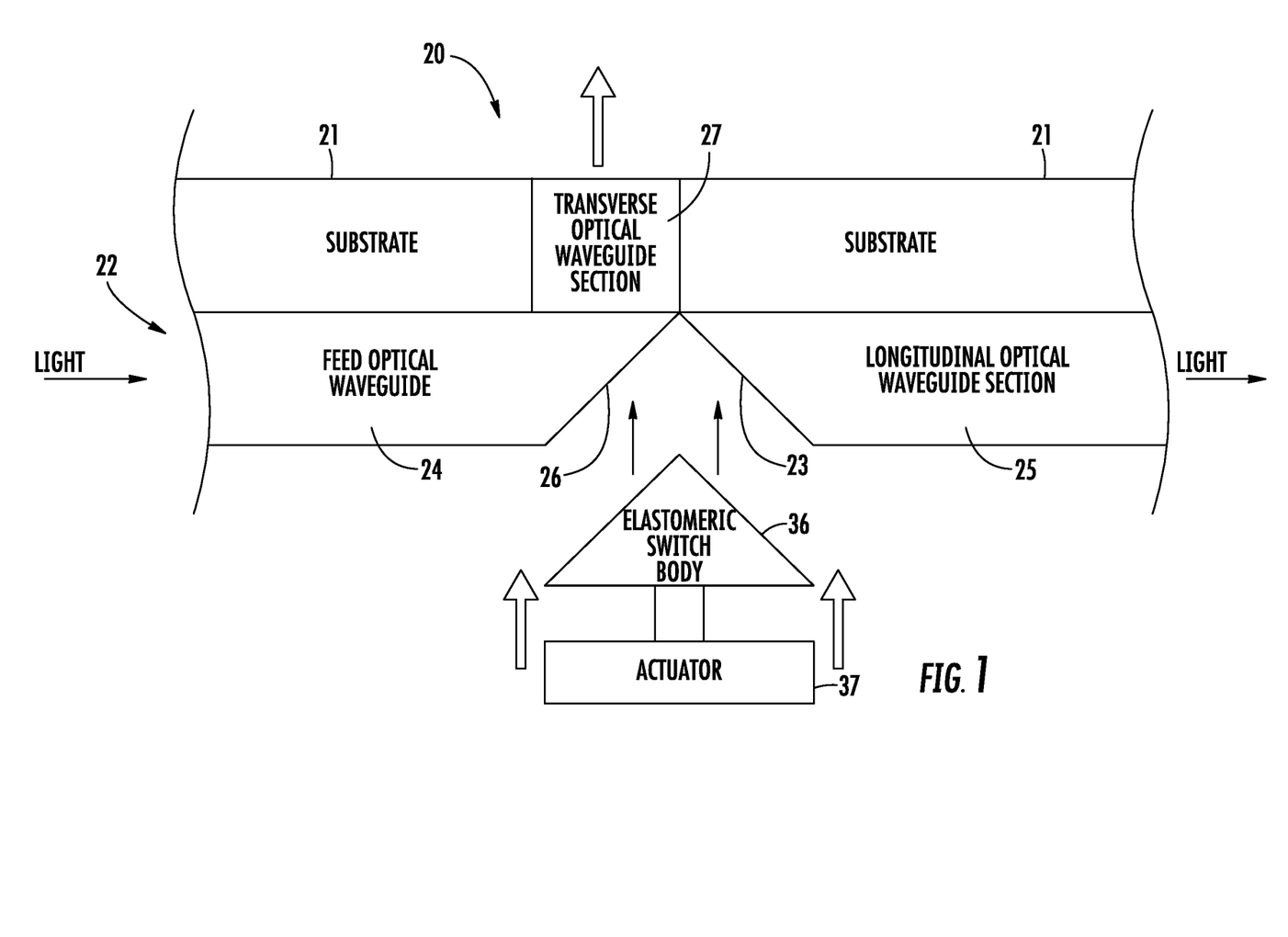
FIG. 1 is a schematic diagram of an optical device in accordance with the present invention.
Figure 2:
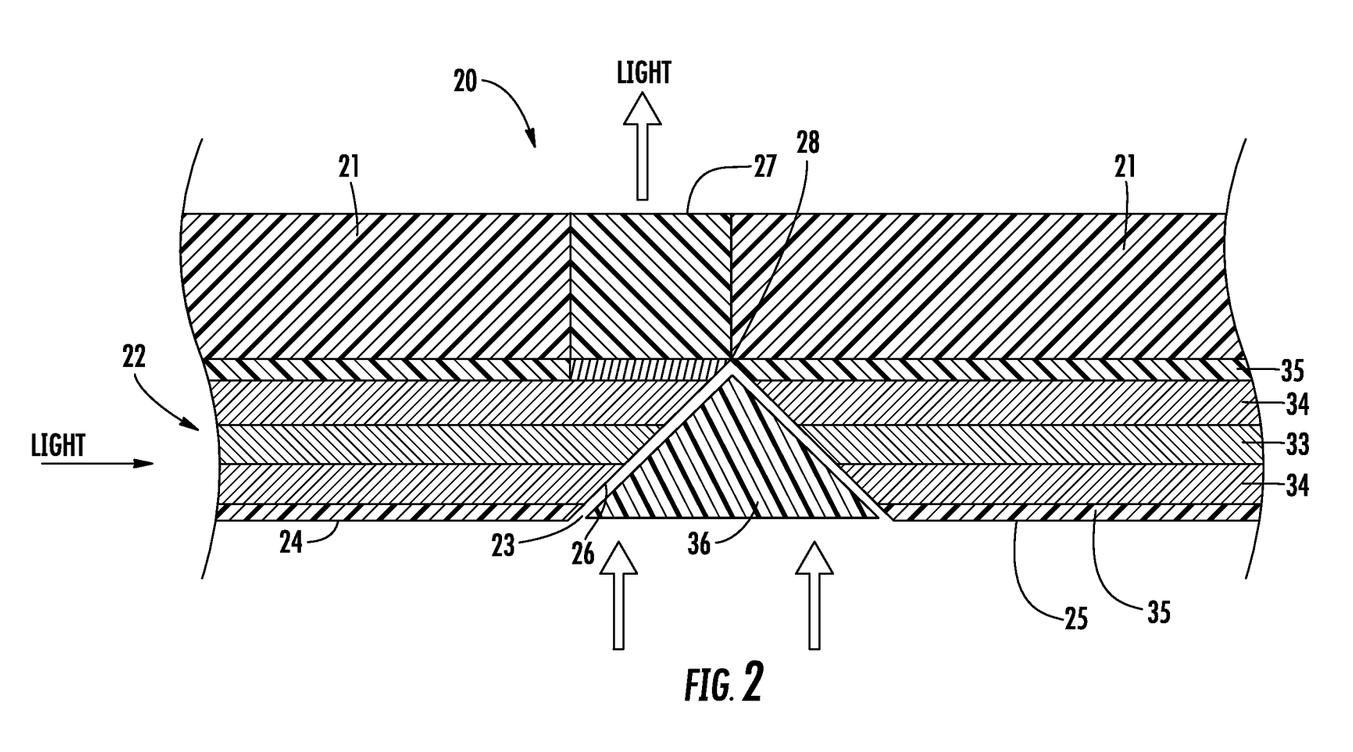
FIG. 2 is a cross-sectional view of a portion of the optical device in FIG. 1 with the elastomeric waveguide switch body in the second position.
Figure 3:
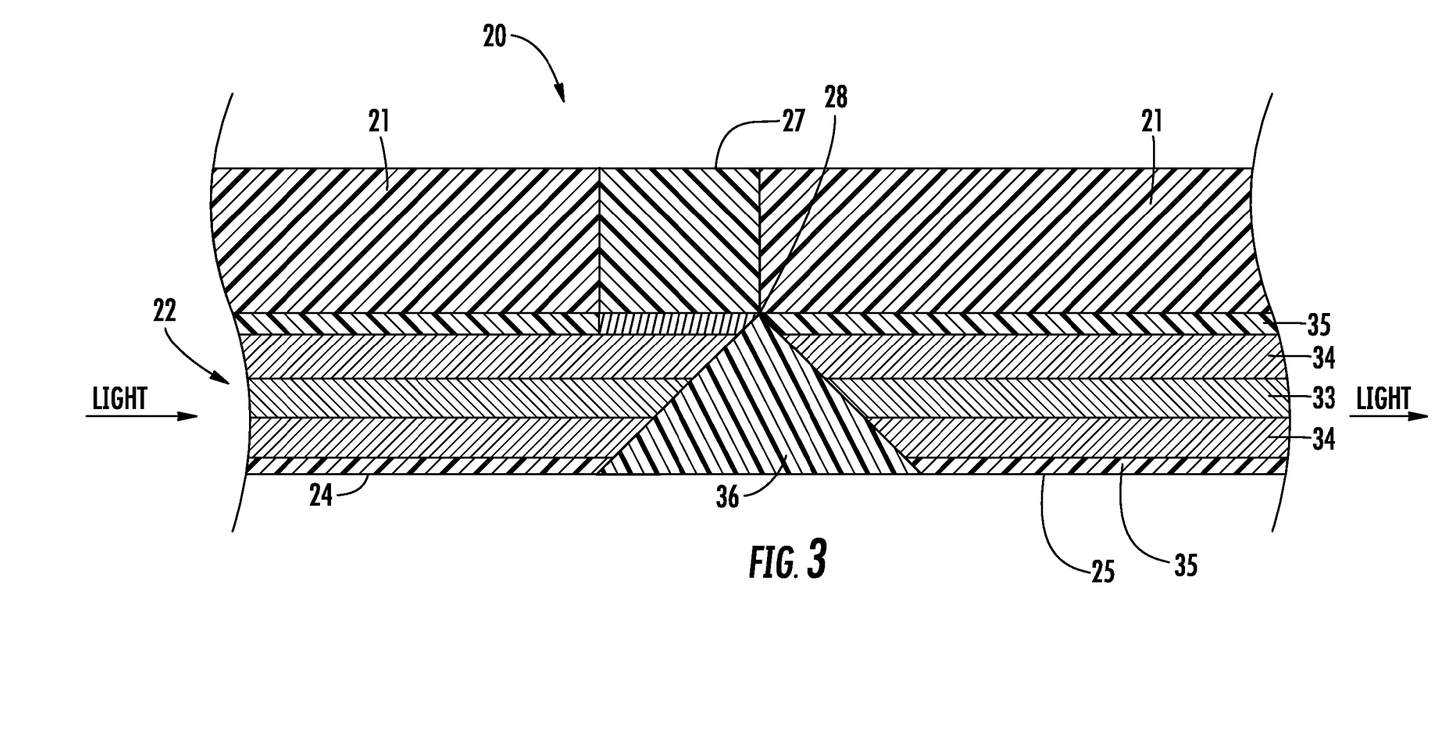
FIG. 3. is a cross-sectional view of a portion of the optical device in FIG. 1 with the elastomeric waveguide switch body in the first position.

Referring initially to FIGS. 1-3, an optical device 20 illustratively includes a substrate 21 and an optical waveguide 22 carried by the substrate. The optical waveguide 22 may be silica fiber or a planar waveguide (of silica or polymer), for example. Additionally, the optical waveguide 22 may be round or square-shaped, as will be appreciated by those skilled in the art. Still further, the optical waveguide 22 may be a multi-mode optical waveguide or may be a single-mode optical waveguide. The optical waveguide 22 includes a core 33 (e.g., doped silica glass core) having a core index of refraction, and a respective cladding 34 surrounding the core and having a cladding index of refraction. A buffer layer 35 surrounds the cladding 34. The buffer layer 35 is optional.

The substrate 21 may be a circuit board, such as, for example, a printed circuit board (PCB) with other electronic components, not shown. The optical waveguide 22 has a notch 23 therein defining a feed optical waveguide 24 and a longitudinal optical waveguide section 25 inline with the feed optical waveguide and on the side of the notch. The notch 23 may be formed using conventional techniques, such as, for example, molding, sawing, and laser ablation. The notch 23 is illustratively V-shaped, but may be other shapes. As will be appreciated by those skilled in the art, the notch 23 is cut as a flat face 26 to define a mirror surface. In other words, the flat face 26 of the notch is angled to produce a near total internal reflection (TIR), as caused by the interface between the optical waveguide 22 and air. The notch 23 may be another shape so long as the flat face 26 of the notch reflects light from the end of the feed optical waveguide 24 toward a transverse optical waveguide section 27 carried by the substrate 21 and transversely aligned with the feed optical waveguide 24 adjacent the notch 23.

The transverse optical waveguide section 27 may be secured to the optical waveguide 22 with an adhesive 28, for example. In particular, if the optical waveguide 22 is circular in cross-sectional shape, the optical waveguide may be polished to form a flat surface to couple with the transverse optical waveguide section 27.

The transverse optical waveguide section 27 may be a polymer body, such as, for example, an elastomeric polymer body, such as that described in application publication no. US-2012-0189253-A1, and assigned to the assignee of the present application, the entire contents of which are herein incorporated by reference. If the transverse optical waveguide section 27 is a polymer body, then polishing of the optical waveguide 22 may not be needed.

An elastomeric waveguide switch body 36 is configured to be moved between a first position (FIG. 3) within the notch 23 so that light is switched from the feed optical waveguide 24 to the longitudinal optical waveguide section 25, and a second position (FIG. 2) removed from the notch so that light is switched from the feed optical waveguide to the transverse optical waveguide section 27. The elastomeric waveguide switch body 36 is illustratively triangular in cross-sectional shape, but may be another shape to match the shape of the notch 23.

The elastomeric waveguide switch body 36 preferably has a refractive index that is within ±10% of the effective index of the refraction of the optical waveguide 22, and more preferably with in ±1%. More particularly, for a single-mode optical waveguide, the elastomeric waveguide switch body 36 may have a refractive index that is within ±0.5% of the effective index of refraction of the single-mode optical waveguide. The elastomeric waveguide switch body 36 may be formed from different monomers in relative amounts so that the cured elastomeric polymer waveguide switch body 36 has a refractive index within ±10%, and more preferably within ±1%, of the optical waveguide 22 effective refractive index.

The elastomeric waveguide switch body 36 advantageously is matched so that light that would otherwise be reflected from the flat face 26 instead passes through to the longitudinal optical waveguide section 25 with reduced optical loss. Open air between the elastomeric waveguide switch body 36 and the flat face 26 of the optical waveguide 22 is reduced by wetting of the elastomeric waveguide switch body 36 to the optical waveguide 22, as air may cause light from the optical waveguide to reflect or scatter, thus causing an increased optical loss. The elastomeric waveguide switch body 36 advantageously guides light and may act as an extension of the optical waveguide 22.

An actuator 37 is also coupled to the elastomeric waveguide switch body 36 to move the switch body between the first and second positions. The default position of the elastomeric waveguide switch body 36 may be set through the configuration of the actuator 37 so that it is either removed from the notch 23, i.e. the second position, or within the notch, i.e. the first position.

The actuator 37 may be a piezoelectric actuator or a solenoid, for example. The actuator may be advantageously configured as a bi-stable actuator so that it uses power only to move between the first and second positions. When the actuator 37 is a bi-stable actuator, the optical switch 20 may be implemented as a latching switch. The actuator 37 may be another type of switching device and may include other cooperating components, for example a biasing device.

Figure 4:
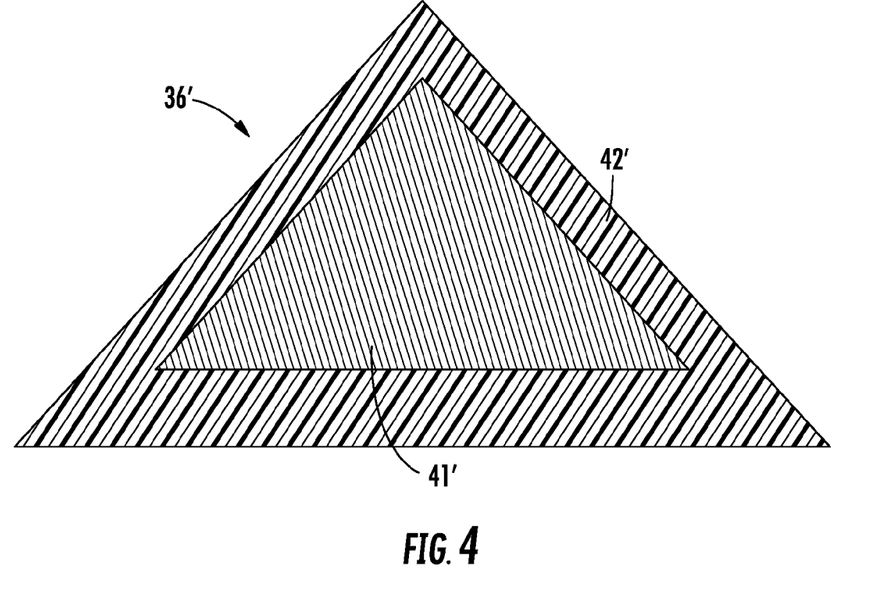
FIG. 4 is an enlarged cross-sectional view of an elastomeric waveguide switch body in accordance with another embodiment of the present invention.

Referring now to FIG. 4, another embodiment of the elastomeric waveguide switch body 36' illustratively includes an optical device core 41', for example a glass prism. The optical device core 41' may be another material or combination of materials. The optical device core 41' is coated with an elastomeric polymer material outer layer 42'. The elastomeric polymer material outer layer is particularly advantageous on the two faces of the elastomeric waveguide switch body 36' that are adjacent feed optical waveguide 24 and the longitudinal optical waveguide section 25.

Figure 5:
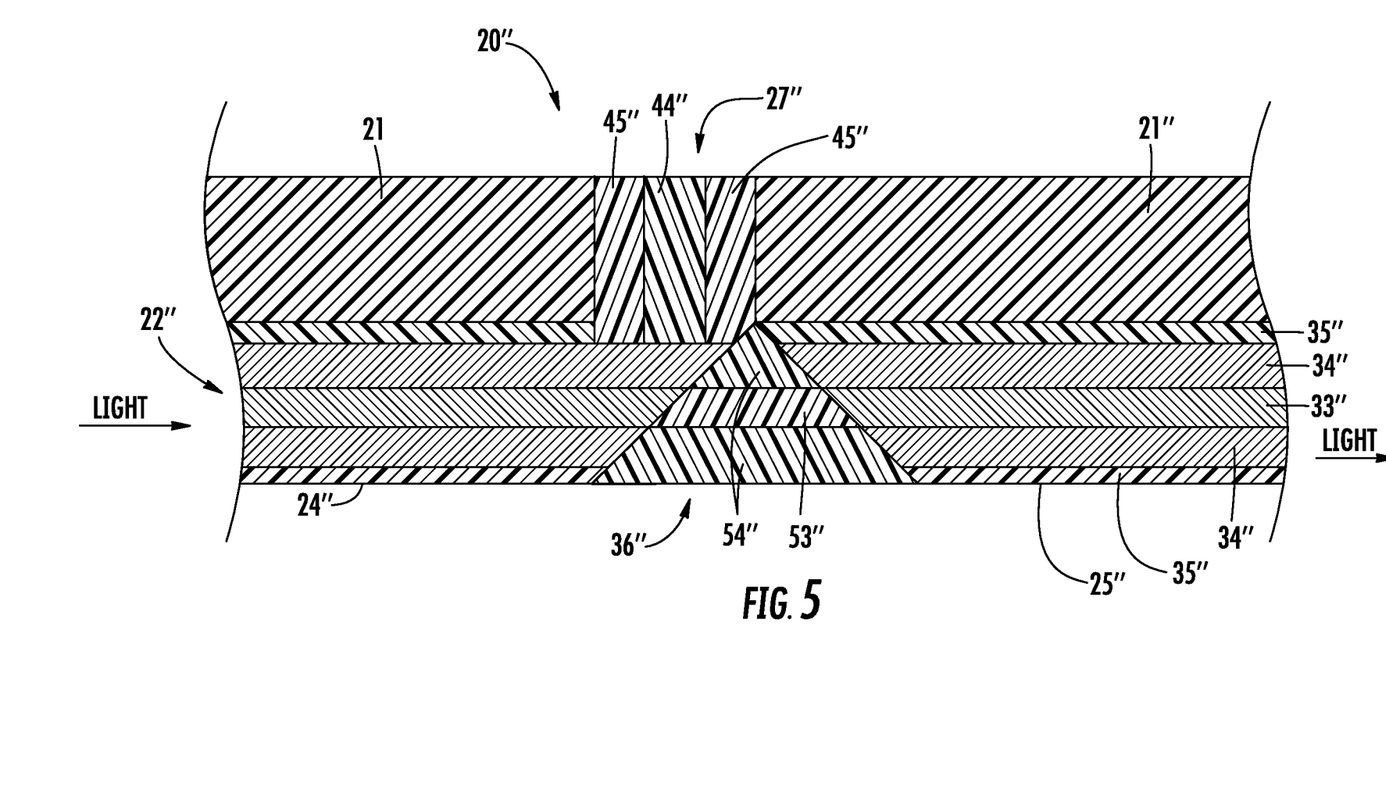
FIG. 5 is a cross-sectional view of a portion of another embodiment of an optical device in accordance with the present invention.

Referring now to FIG. 5, in another embodiment of the optical device 20", the elastomeric waveguide switch body 36" includes elastomeric optical polymers or optics coated by an elastomeric polymer material. More particularly, an inner portion 53", or core, of the elastomeric waveguide switch body 36" has a first index of refraction and is optically aligned with the core 33" of the optical waveguide 22". The first index of refraction advantageously is within ±10%, and preferably within ±1%, of the index of refraction of the core 33" of the optical waveguide 22". That is, the index of refraction of the elastomeric waveguide switch body inner portion 53" is chosen to be substantially the same as that of the core 33" of the optical waveguide 22".

The elastomeric waveguide switch body 36" also has an outer portion or cladding 54" surrounding the elastomeric body inner portion 53", and has a second index of refraction. The outer portion or cladding 54" is optically aligned with the cladding 34" of the optical waveguide 22". The outer portion 54" advantageously is within ±10%, and preferably within ±1%, of the index of refraction of the cladding 34" of the optical waveguide 22". That is, the index of refraction of the elastomeric waveguide switch body outer portion 54" is chosen to be substantially the same as that of the cladding core 34" of the optical waveguide 22". In other words, the elastomeric waveguide switch body 36" and the optical waveguide 22" would preferably have respective gradient refraction indices within ±1% of each other.

The transverse optical waveguide section 27" also includes a transverse optical waveguide section inner portion or core 44" that also has a first index of refraction and is optically aligned with the core 33" of the optical waveguide 22". The first index of refraction of the transverse optical waveguide section inner portion 44" advantageously is within ±10% of the index of refraction of the core 33" of the optical waveguide 22".

The transverse optical waveguide section 27" also includes a transverse optical waveguide section outer portion or cladding 45" and has a second index of refraction. The outer portion 45" is optically aligned with the cladding 34" of the optical waveguide 22". The outer portion 45" advantageously is within ±10%, and preferably within ±1%, of the index of refraction of the cladding 34" of the optical waveguide 22".

Figure 6:
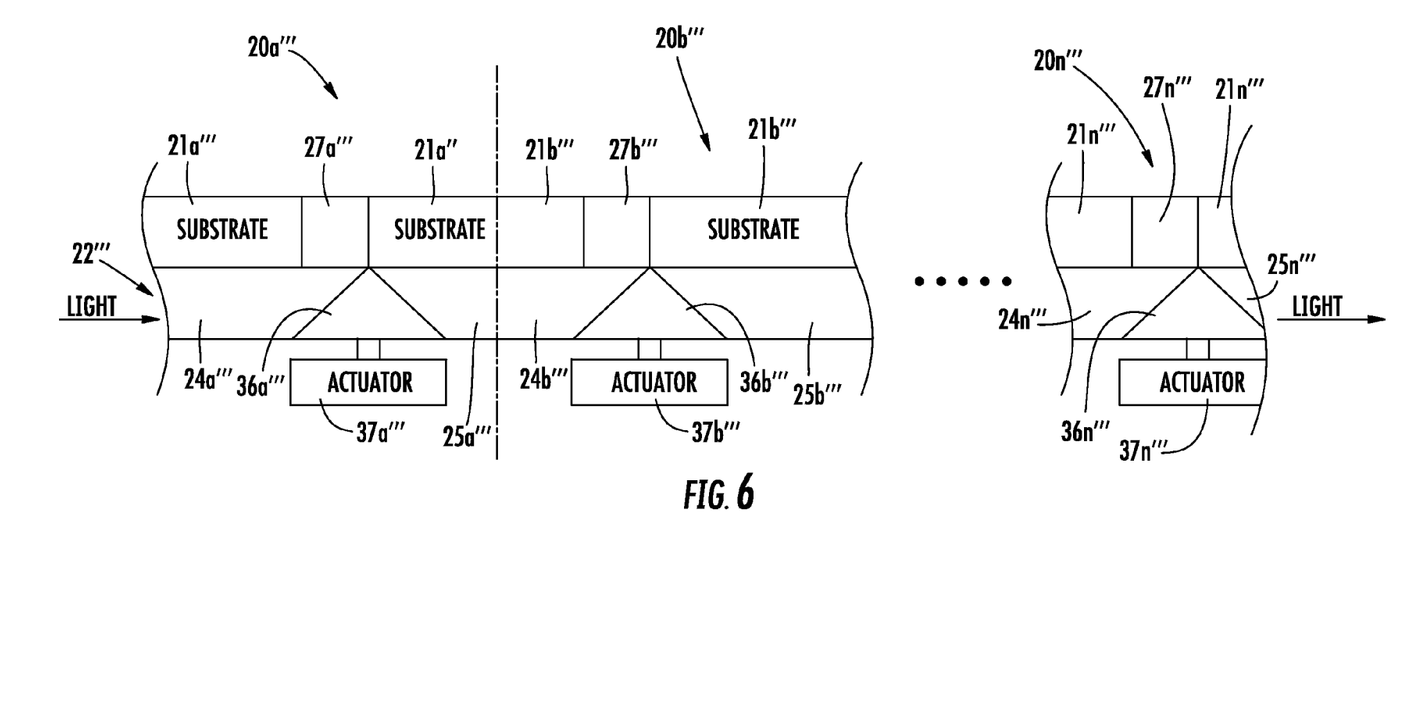
FIG. 6 is a schematic diagram of an optical device having a plurality of further notches and elastomeric waveguide switch bodies in accordance with the present invention.

Referring now to FIG. 6, a 1×N optical switch illustratively includes elastomeric waveguide switch bodies 36a'''-36n''' within corresponding notches. More particularly, light travels along the optical waveguide 22''' passing through N ports, i.e. N elastomeric waveguide switch bodies 36a'''-36n''', until an elastomeric waveguide switch body in the second position is encountered. In other words, the 1×N optical switch is a sequential switch. When an elastomeric waveguide switch body 36a'''-36n''' is encountered, the light is switched to the corresponding transverse optical waveguide tap 27'''.

As will be appreciated by those skilled in the art, a prior art optical switch of this type has not been considered for high values of N because the light must propagate through all switching ports (1 to N−1) to reach the Nth port. Loss and back reflection at each port is additive and thus the loss and back reflection over N ports may be too high. As will be appreciated by those skilled in the art, the elastomeric waveguide switch body 36''' advantageously "wets out" on its mating surface to reduce the presence of "an optical interface" and reduce additive losses.

Figure 7:
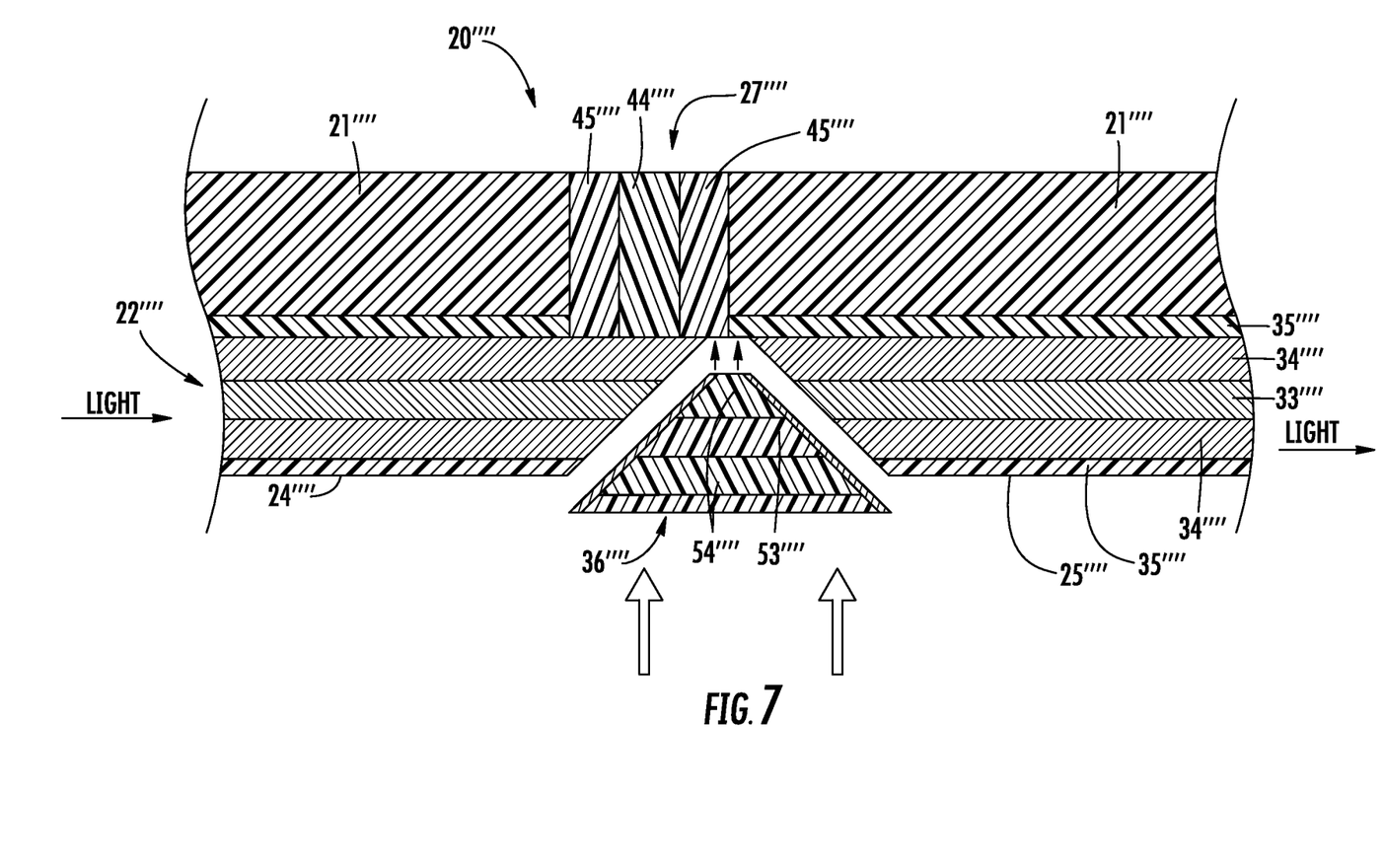
FIG. 7 is a cross-sectional view of a portion of another embodiment of an optical device with the elastomeric waveguide switch body in the first position in accordance with the present invention.

Referring now to FIG. 7, in another embodiment of the optical device 20'''', the elastomeric waveguide switch body 36'''', which is illustratively trapezoidal in shape, includes an embedded optical waveguide coated by an elastomeric polymer material. More particularly, an inner portion 53'''', or core, of the elastomeric waveguide switch body 36'''' has a first index of refraction and is optically aligned with the core 33'''' of the optical waveguide 22''''. The first index of refraction advantageously is within ±10%, and preferably within ±1%, of the index of refraction of the core 33'''' of the optical waveguide 22''''. That is, the index of refraction of the elastomeric waveguide switch body inner portion 53'''' is chosen to be substantially the same as that of the core 33'''' of the optical waveguide 22''''.

The outer portion or cladding 54'''' is optically aligned with the cladding 34'''' of the optical waveguide 22''''. The outer portion 54'''' advantageously is within ±10%, and preferably within ±1%, of the index of refraction of the cladding 34'''' of the optical waveguide 22''''. That is, the index of refraction of the waveguide switch body outer portion 54'''' is chosen to be substantially the same as that of the cladding core 34'''' of the optical waveguide 22''''. The respective portions (inner and outer) of each elastomeric polymer material layer are also formed to be within ±10%, and preferably within ±1%, of the index of refraction of both the inner and outer portions 53'''', 54'''' and the optical waveguide 22''''. In other words, the waveguide switch body 36'''' including the elastomeric polymer material and the optical waveguide 22'''' would preferably have respective gradient refraction indices within ±1% of each other.

In some embodiments, the elastomeric waveguide switch body 36'''' may be a silica fiber, and may have an elastomeric coating on ends thereof. The coating may be less than 100 microns, for example, and may also include a core and a cladding surrounding the core.

As illustrated, the elastomeric waveguide switch body 36'''' is relatively larger with respect to the other embodiments of the elastomeric waveguide bodies. The increased size may facilitate handling and assembly. Moreover, the increased mass of the elastomeric waveguide switch body 36'''' may slow the switching speed.

Figure 8:
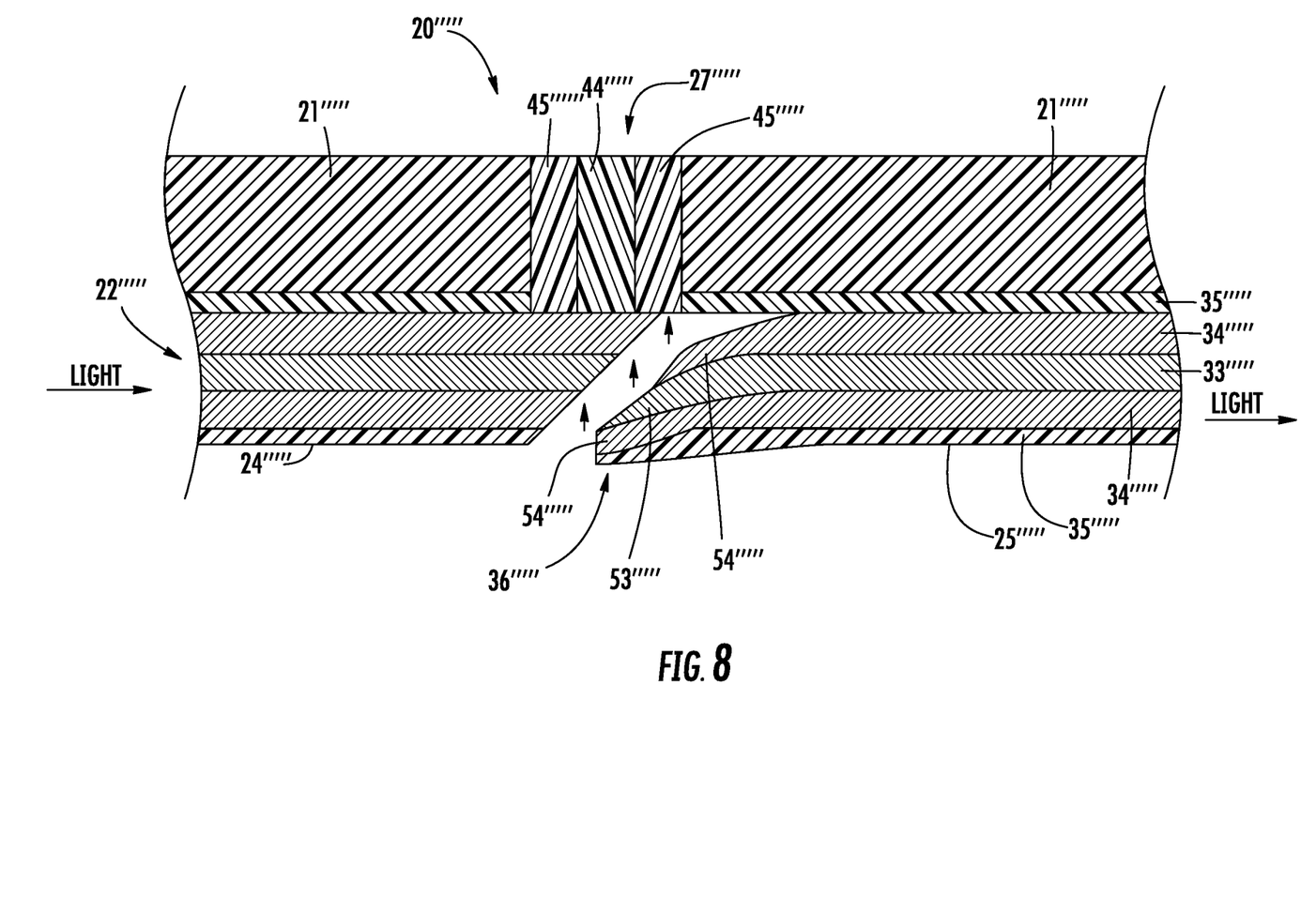
FIG. 8 is a cross-sectional view of a portion of another embodiment of an optical device with the elastomeric waveguide switch body in the first position in accordance with the present invention.

Referring now to FIG. 8, in yet another embodiment of the optical device 20''''', the elastomeric waveguide switch body 36''''' is coupled to an end or tip of the longitudinal optical waveguide section 25''''' and it bent away from the substrate 21''''' in the second position. An inner portion 53''''', or core, of the elastomeric waveguide switch body 36''''' has a first index of refraction and is optically aligned with the core 33''''' of the optical waveguide 22'''''. The first index of refraction advantageously is within ±10%, and preferably within ±1%, of the index of refraction of the core 33''''' of the optical waveguide 22'''''. That is, the index of refraction of the elastomeric waveguide switch body inner portion 53''''' is chosen to be substantially the same as that of the core 33''''' of the optical waveguide 22'''''.

The elastomeric waveguide switch body 36''''' includes an outer portion or cladding 54''''' surrounding the core 53''''', and has a second index of refraction. The outer portion or cladding 54''''' is optically aligned with the cladding 34''''' of the optical waveguide 22'''''. The outer portion 54''''' advantageously is within ±10%, and preferably within ±1%, of the index of refraction of the cladding 34''''' of the optical waveguide 22'''''. That is, the index of refraction of the waveguide switch body outer portion 54''''' is chosen to be substantially the same as that of the cladding core 34''''' of the optical waveguide 22'''''. In other words, the waveguide switch body 36''''' and the optical waveguide 22''''' would preferably have respective gradient refraction indices within ±1% of each other.

The longitudinal optical waveguide section 25''''', including the waveguide switch body 36''''' at the end, is illustratively bent away from the substrate 21''''' in the second position. The bending design advantageously reduces the number of interferences along the light path and losses associated therewith. As will be appreciated by those skilled in the art, the longitudinal optical waveguide section 25''''' may be moved between the first and second positions by an actuator (not shown) as described herein.

Figure 9:
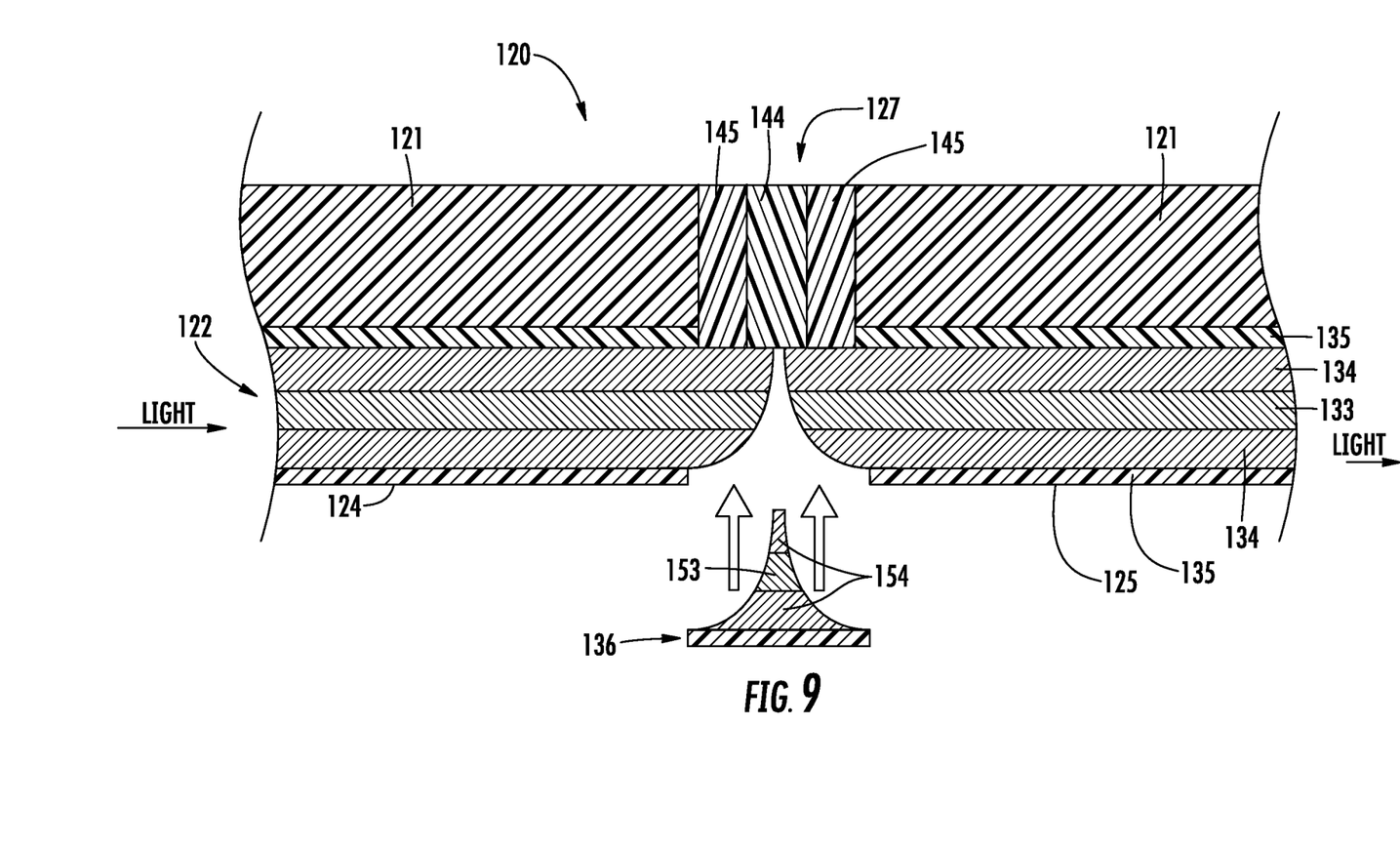
FIG. 9 is a cross-sectional view of a portion of another embodiment of an optical device with the elastomeric waveguide switch body in the first position in accordance with the present invention.

Referring now to FIG. 9, in yet another embodiment of the optical device 120, the elastomeric waveguide switch body 136 is curved to define concave-shaped end faces. The optical waveguide 122 has a corresponding curved notch defined therein, and more particularly, the notch is curved to define convex-shaped end faces or end surfaces of the optical waveguides 124, 125. The convex surfaces of the optical waveguide 122 that define the notch are positioned symmetrically with respect to the transverse optical waveguide section 127. The convex shaped end faces of the optical waveguide 122, 124 and 125 advantageously aid in focusing light on the core 144 of the transverse optical waveguide section 127.

The transverse optical waveguide section 127 may also be curved to define a "barrel-shaped" or parabolic shape, for example. As will be appreciated by those skilled in the art, such a shape may form a non-imaging optic that may redirect off-angle light rays to be increasingly parallel with the axis of the transverse optical waveguide section 127. Where the transverse optical waveguide section 127 is curved, a relatively low refractive index surrounding material (not shown) may be desirable. Alternatively, the transverse optical waveguide section 127 may include a GRIN lens, for example.

An inner portion 153, or core, of the elastomeric waveguide switch body 136 has a first index of refraction and is optically aligned with the core 133 of the optical waveguide 122. The first index of refraction advantageously is within ±10%, and preferably within ±1%, of the index of refraction of the core 133 of the optical waveguide 122. That is, the index of refraction of the elastomeric waveguide switch body inner portion 153 is chosen to be substantially the same as that of the core 153 of the optical waveguide 122.

The elastomeric waveguide switch body 136 includes an outer portion or cladding 154 surrounding the core 153, and has a second index of refraction. The outer portion or cladding 154 is optically aligned with the cladding 134 of the optical waveguide 122. The outer portion 154 advantageously is within ±10%, and preferably within ±1%, of the index of refraction of the cladding 134 of the optical waveguide 122. That is, the index of refraction of the waveguide switch body outer portion 154 is chosen to be substantially the same as that of the cladding 134 of the optical waveguide 122. In other words, the waveguide switch body 136 and the optical waveguide 122 would preferably have respective gradient refraction indices within ±1% of each other.

Indeed, while the illustrated examples illustrate a step index, a graded index may be used. In designs where the thickness of the optical body, or more particularly, the length of the optical path, is about equal to or less than the width of the core 33 of the optical waveguide 22, the optical switch 20, or optical body, may not include a core and a cladding surrounding the core. Instead, the optical switch 20 may have a uniform refractive index that is within ±10%, and preferably within ±1% of the index of refraction of the core 33 of the optical waveguide 22.

The optical switch 20 advantageously may not rely on free space propagation and has a reduced loss due the retention of the light within the guiding optics. The optical switch 20 may also have decreased sensitivity to vibration. Additionally, the switch 20 may have reduced power consumption and a relatively reduced cost. Moreover, the optical device 20, or N optical devices may be particularly advantageous in a microelectromechanical system (MEMS) type of device, and more particularly, in an optical microelectromechanical system (MOEMS) device.

A method aspect is directed to a method of switching light within an optical device 20 comprising an optical waveguide 22 carried by a substrate 21 and having a notch 23 therein defining a feed optical waveguide 24 and a longitudinal optical waveguide section 25 on opposite sides of the notch. The optical device 20 also includes a transverse optical waveguide section 27 carried by the substrate 21 and transversely aligned with the feed optical waveguide 24 adjacent the notch 23. The method includes moving an elastomeric waveguide switch body 36 between a first position within the notch 23 so that light is switched from the feed optical waveguide 24 to the longitudinal optical waveguide section 25 and a second position removed from the notch so that light is switched from the feed optical waveguide to the transverse optical waveguide section 27.

It should be noted that while light is illustratively traveling from a source adjacent the feed optical waveguide 24 (i.e. left to right), light may travel in other directions. For example, the source may be adjacent the traverse optical waveguide section 27 or the longitudinal optical waveguide section 25. Further details of an optical switch may be found in co-pending application Ser. No. 12/610,432 which is assigned to the assignee of the present application, and the entire contents of which is herein incorporated by reference.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An optical device comprising:
   a substrate;
   an optical waveguide carried by said substrate and having a notch therein defining a feed optical waveguide and a longitudinal optical waveguide section on opposite longitudinal sides of the notch;
   a transverse optical waveguide section carried by said substrate and transversely aligned with said feed optical waveguide adjacent the notch; and
   an elastomeric waveguide switch body configured to be moved between a first position within the notch and operative to switch light from said feed optical waveguide to said longitudinal optical waveguide section, and a second position removed from the notch and operative to switch light from said feed optical waveguide to said transverse optical waveguide section.

2. The optical device of claim 1, wherein the notch comprises a V-shaped notch.

3. The optical device of claim 1, wherein the notch comprises a V-shaped notch with convex faces on ends of said feed optical waveguide and said longitudinal optical waveguide section.

4. The optical device of claim 1, further comprising an actuator carried by said substrate and coupled to said elastomeric waveguide switch body.

5. The optical device of claim 1, wherein said elastomeric waveguide switch body and said optical waveguide have respective refractive indices within ±10% of each other.

6. The optical device of claim 1, wherein said elastomeric waveguide switch body and said optical waveguide have respective gradient refractive indices within ±10% of each other.

7. The optical device of claim 1, wherein said elastomeric waveguide switch body comprises a core and an elastomeric layer surrounding said core.

8. The optical device of claim 1, wherein said elastomeric waveguide switch body comprises an elastomeric polymer.

9. The optical device of claim 1, wherein said optical waveguide comprises a core, a cladding surrounding said core, and a buffer layer surrounding said cladding.

10. The optical device of claim 9, wherein said elastomeric waveguide switch body comprises an elastomeric core and an elastomeric cladding surrounding said elastomeric core, said elastomeric core and said elastomeric cladding being aligned with said core and cladding of said optical waveguide when in the first position.

11. The optical device of claim 1, wherein the optical waveguide has at least a second notch elastomeric notch therein; and further comprising at least one second transverse optical waveguide section and at least one second elastomeric waveguide switch body associated with the second notch.

12. An optical device comprising:
a substrate;
an optical waveguide carried by said substrate and having a V-shaped notch therein defining a feed optical waveguide and a longitudinal optical waveguide section on opposite longitudinal sides of the V-shaped notch;
a transverse optical waveguide section carried by said substrate and transversely aligned with said feed optical waveguide adjacent the V-shaped notch; and
an elastomeric polymer waveguide switch body configured to be moved between a first position within the V-shaped notch and operative to switch light from said feed optical waveguide to said longitudinal optical waveguide section, and a second position removed from the V-shaped notch and operative to switch light from said feed optical waveguide to said transverse optical waveguide section.

13. The optical device of claim 12, further comprising an actuator carried by said substrate and coupled to said elastomeric polymer waveguide switch body.

14. The optical device of claim 12, wherein said optical waveguide comprises a core and a cladding surrounding the core; and wherein said elastomeric polymer waveguide switch body and said core have respective refractive indices within ±10% of each other.

15. The optical device of claim 12, wherein said elastomeric polymer waveguide switch body comprises a core and an elastomeric polymer layer surrounding said core.

16. The optical device of claim 12, wherein said optical waveguide comprises a core and a cladding surrounding the core; and wherein said elastomeric waveguide switch body comprises an elastomeric core and an elastomeric cladding surrounding said elastomeric core, said elastomeric core and said elastomeric cladding being aligned with said core and cladding of said optical waveguide when in the first position.

17. A method of switching light within an optical device comprising an optical waveguide carried by a substrate and having a notch therein defining a feed optical waveguide and a longitudinal optical waveguide section on opposite longitudinal sides of the notch, and a transverse optical waveguide section carried by the substrate and transversely aligned with the feed optical waveguide adjacent the notch, the method comprising:
moving an elastomeric waveguide switch body between a first position within the notch and operative to switch light from the feed optical waveguide to the longitudinal optical waveguide section and a second position removed from the notch and operative to switch light from the feed optical waveguide to the transverse optical waveguide section.

18. The method of claim 17, wherein the elastomeric waveguide switch body is moved using an actuator carried by said substrate and coupled to the elastomeric waveguide switch body.

19. The method of claim 17, wherein moving the elastomeric waveguide switch body comprises moving an elastomeric waveguide switch body having a respective refractive index within ±10% of the optical waveguide.

20. The method of claim 16, wherein moving the elastomeric waveguide switch body comprises moving an elastomeric waveguide switch body having a respective gradient refractive index within ±10% of the optical waveguide.

21. The method of claim 17, wherein moving the elastomeric waveguide switch body comprises moving an elastomeric polymer waveguide switch body.

* * * * *